United States Patent
Wang et al.

(10) Patent No.: US 8,385,634 B1
(45) Date of Patent: *Feb. 26, 2013

(54) SELECTING AND APPLYING A COLOR RANGE IN AN IMAGE MASK

(75) Inventors: Jue Wang, Seattle, WA (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1220 days.

This patent is subject to a terminal disclaimer.

(21) Appl. No.: 12/197,912

(22) Filed: Aug. 25, 2008

(51) Int. Cl.
*G06K 9/00* (2006.01)

(52) U.S. Cl. ........ 382/162; 382/167; 382/274; 382/260; 382/263; 382/128

(58) Field of Classification Search .................. 382/128, 382/162, 167, 274, 260, 263, 302; 345/589, 345/592, 604, 605; 348/453
See application file for complete search history.

(56) References Cited

U.S. PATENT DOCUMENTS

| 2007/0036456 A1* | 2/2007 | Hooper | 382/274 |
| 2007/0280531 A1* | 12/2007 | Zitnick | 382/162 |
| 2010/0021082 A1* | 1/2010 | Declerck | 382/294 |

OTHER PUBLICATIONS

M. Haindl, J. Grim, P. Somol, P. Pudil, and M. Kudo, "A Gaussian Mixture-Based Colour Texture Model," Proceedings of the 17th International Conference on Pattern Recognition (ICPR'04), Aug. 2004, pp. 177-180, vol. 3.

S. Belongie, C. Carson, H. Greenspan, and J. Malik, "Color- and Texture-Based Image Segmentation Using EM and Its Application to Content-Based Image Retrieval," Proceedings of the Sixth International Conference on Computer Vision, 1998.

J. Wang, "Discriminative Gaussian Mixtures for Interactive Image Segmentation," Proceedings of the International Conference on Acoustics, Speech, and Signal Processing (ICASSP'07), Apr. 2007.

T. Yu, C. Zhang, M. Cohen, Y. Rui, and Y. Wu, "Monocular Video Foreground/Background Segmentation by Tracking Spatial-Color Gaussian Mixture Models," IEEE Workshop on Motion and Video Computing (WMVC'07), Feb. 2007.

M. Jones and J. Rehg, "Statistical Color Models with Application to Skin Detection," International Journal of Computer Vision, Jan. 2002, pp. 81-96, vol. 46, No. 1.

C. Rother, V. Kolmogorov, and A. Blake, "GrabCut: Interactive Foreground Extraction using Iterated Graph Cuts," ACM Transactions on Graphics (SIGGRAPH'04), 2004.

X. Bai and G. Sapiro, "A Geodesic Framework for Fast Interactive Image and Video Segmentation and Matting," IEEE International Conference on Computer Vision (ICCV'07), 2007.

* cited by examiner

*Primary Examiner* — Ali Bayat
(74) *Attorney, Agent, or Firm* — Wolfe-SMBC

(57) ABSTRACT

A method, system, and computer-readable storage medium are disclosed for generating a mask based on a color model. In one embodiment, a selection of at least one color in an input image is received. A color model may be determined based on the selection of the at least one color, wherein the color model comprises one or more truncated Gaussian functions. A mask may be generated based on the color model. The mask may comprise a respective value indicating a degree of membership in the mask for each of the plurality of pixels in the input image, wherein the degree of membership in the mask is a function of a similarity in color to the selection.

32 Claims, 9 Drawing Sheets

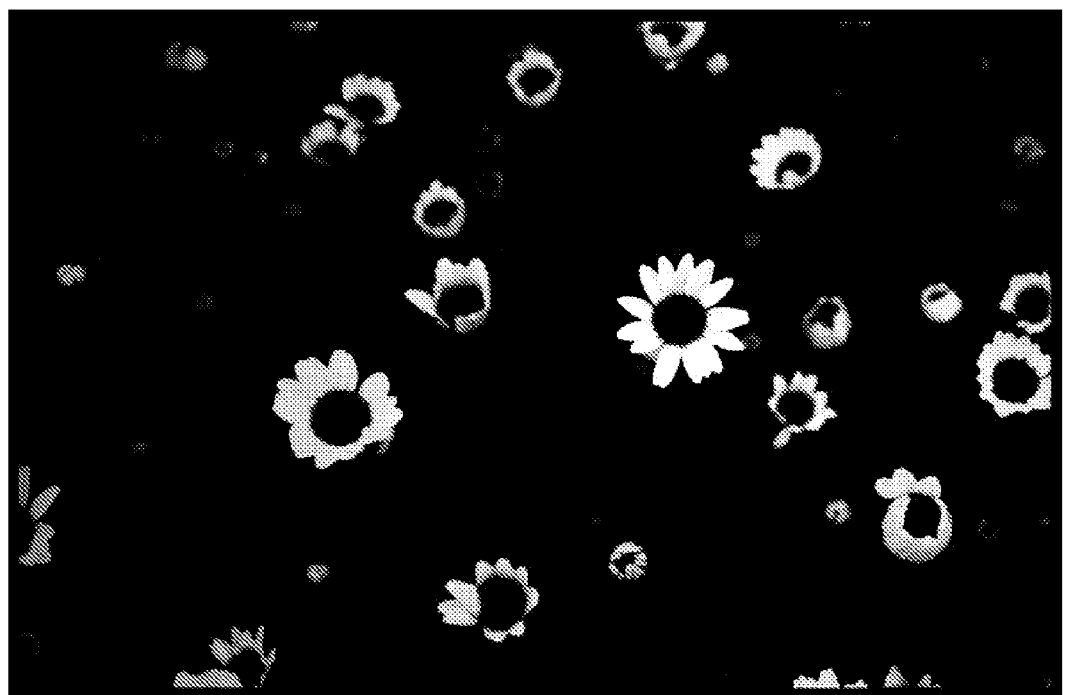
Figure 9 — Output Mask 135B
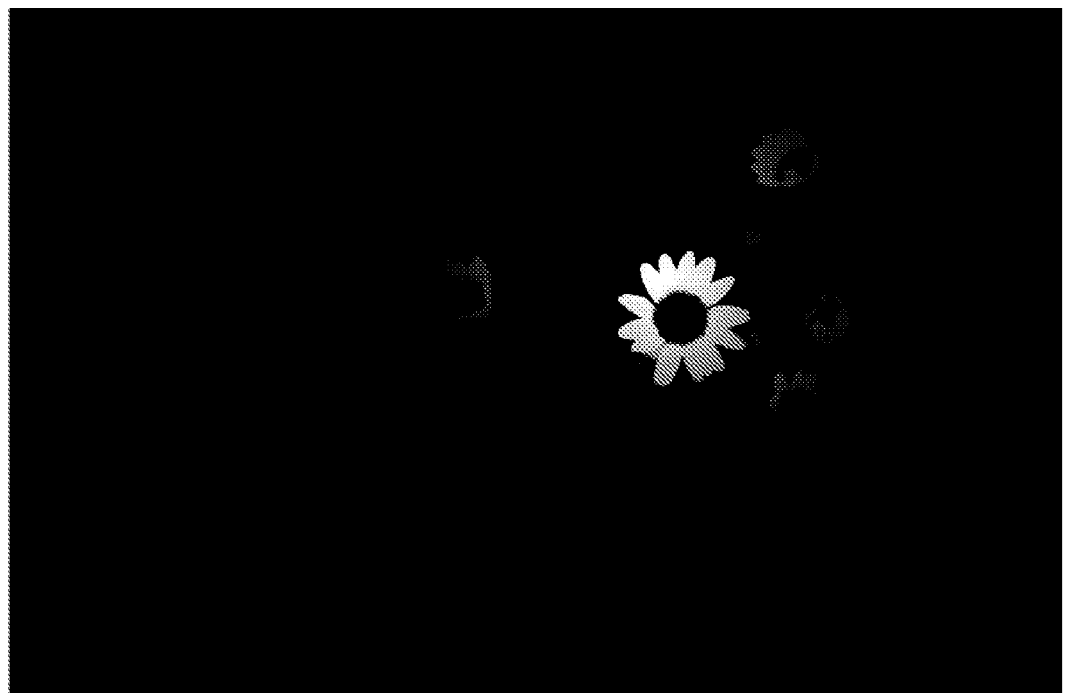
Figure 10 — Output Mask 135C

SELECTING AND APPLYING A COLOR RANGE IN AN IMAGE MASK

BACKGROUND

1. Field of the Invention

The present invention is directed to computer systems; and more particularly, it is directed to the use of color models in digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Vector graphics data may be stored and manipulated as one or more geometric objects built with geometric primitives. The geometric primitives (e.g., points, lines, polygons, Bézier curves, and text characters) may be based upon mathematical equations to represent parts of digital images. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Many digital image editing operations may be applied selectively to a portion of the digital image. In selecting a portion of the digital image, a mask may be used to define a portion of a digital image on which an operation is sought to be performed. A hard mask may represent a binary, "all or nothing" inclusion or exclusion of pixels. A soft mask may comprise a mask having intermediate values which lie between the minimum and maximum values for membership in the mask. For example, a soft mask may potentially comprise integer values between 0 and 255 or floating-point values between 0 and 1. Soft masks may be used for gradual blending of selected pixels into surrounding regions of the digital image. Suitable operations may be applied to modify a mask. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

A selection may represent a region of interest in the digital image and may include one or more pixels (comprising one or more color channels) and/or geometric objects. A selection may be represented by a mask having a single channel indicating per-pixel membership in the selection. If the mask is a soft mask, then the selection may have elements with partial membership (e.g., feathered edges) indicated by an intermediate value in the mask. In most digital image editors, selections may be generated in various ways. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous.

The Gaussian Mixture Model (GMM) is a statistical model that is commonly used in a variety of research and application areas such as the modeling of color distributions in digital images. For example, GMMs have been used to model human skin color distributions in RGB color space. In interactive image segmentation systems, GMMs have been used to model the user selected foreground and background colors and to generate a foreground probability map. In prior approaches, a fixed number of full Gaussian functions are typically used in a particular GMM used for modeling color distributions. In prior approaches, such a GMM is typically built in an off-line model by collecting color samples and then building the GMM once based on the color samples; if new samples are provided, then a new color model is typically built.

SUMMARY

Various embodiments of systems, methods, and computer-readable storage media for generating a mask based on a color model are disclosed. In one embodiment, a selection of at least one color in an input image may be received. The input image may comprise a plurality of pixels, and the selection may comprise one or more pixels selected by a user using any suitable user-interface facilities in an image editor. A color model may be determined based on the selection of the at least one color. In one embodiment, the color model may comprise one or more truncated Gaussian functions. A mask may be generated based on the color model. The mask may comprise a respective value indicating a degree of membership in the mask for each of the plurality of pixels in the input image. The mask may be a soft mask, and the value indicating a degree of membership may be an intermediate value between a maximum and a minimum value in the mask. In one embodiment, the degree of membership in the mask is a function of a similarity in color to the selection. Thus, the color model may be used to generate a mask including a range of colors in the input image. The mask may be used to apply an image-editing operation to desired portions of the image.

In one embodiment, an additional selection of a color in the input image may be added to the color model, subtracted from the color model, or otherwise used to modify the color model. The mask may be dynamically modified accordingly. Similarly, the color model and the mask may be dynamically modified in response to user input to modify a color tolerance of at least one of the Gaussian functions. Gaussian functions may be dynamically added to the color model or dynamically subtracted from the color model in response to user input to modify the color model. A new mask may be generated automatically in response to modifying the number of Gaussian functions.

BRIEF DESCRIPTION OF THE DRAWINGS

FIG. 9 illustrates an example of an output mask generated using a three-dimensional color model according to one embodiment.

FIG. 10 illustrates an example of an output mask generated using a five-dimensional color model according to one embodiment.

Figure 1:
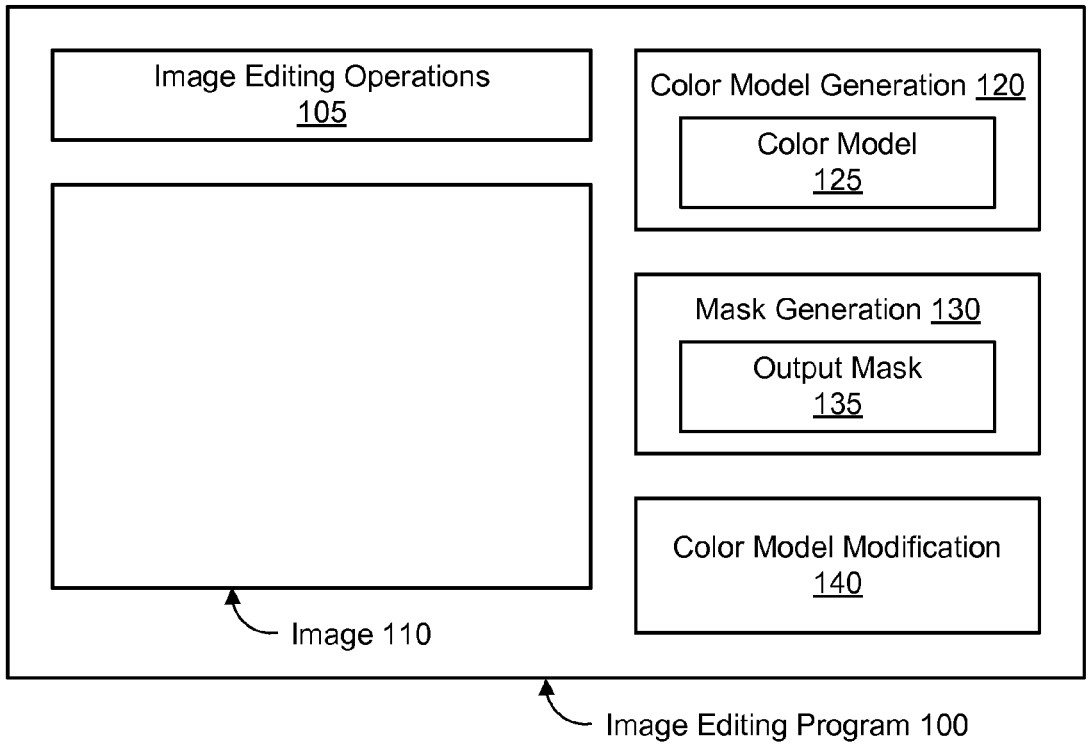
FIG. 1 is a block diagram illustrating an embodiment of a digital image editing program configured for mask generation based on a color model.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, a mask based on a color model may be generated for application of image-editing operations to desired portions of an image. FIG. 1 is a block diagram illustrating an embodiment of a digital image editing program configured for mask generation based on a color model. A digital image editing program 100 may comprise a plurality of image editing operations 105. In one embodiment, a suitable product such as Adobe Photoshop®, Adobe Illustrator®, or Adobe AfterEffects® (all available from Adobe Systems, Inc.) may be used as the image editor 100. The image editing program 100 may be used to create and/or modify a digital image 110. The image editing operations 105 may comprise suitable operations for modifying pixels and/or geometric objects of the image 110. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to images (including selections within an image) and/or masks.

Figure 12:
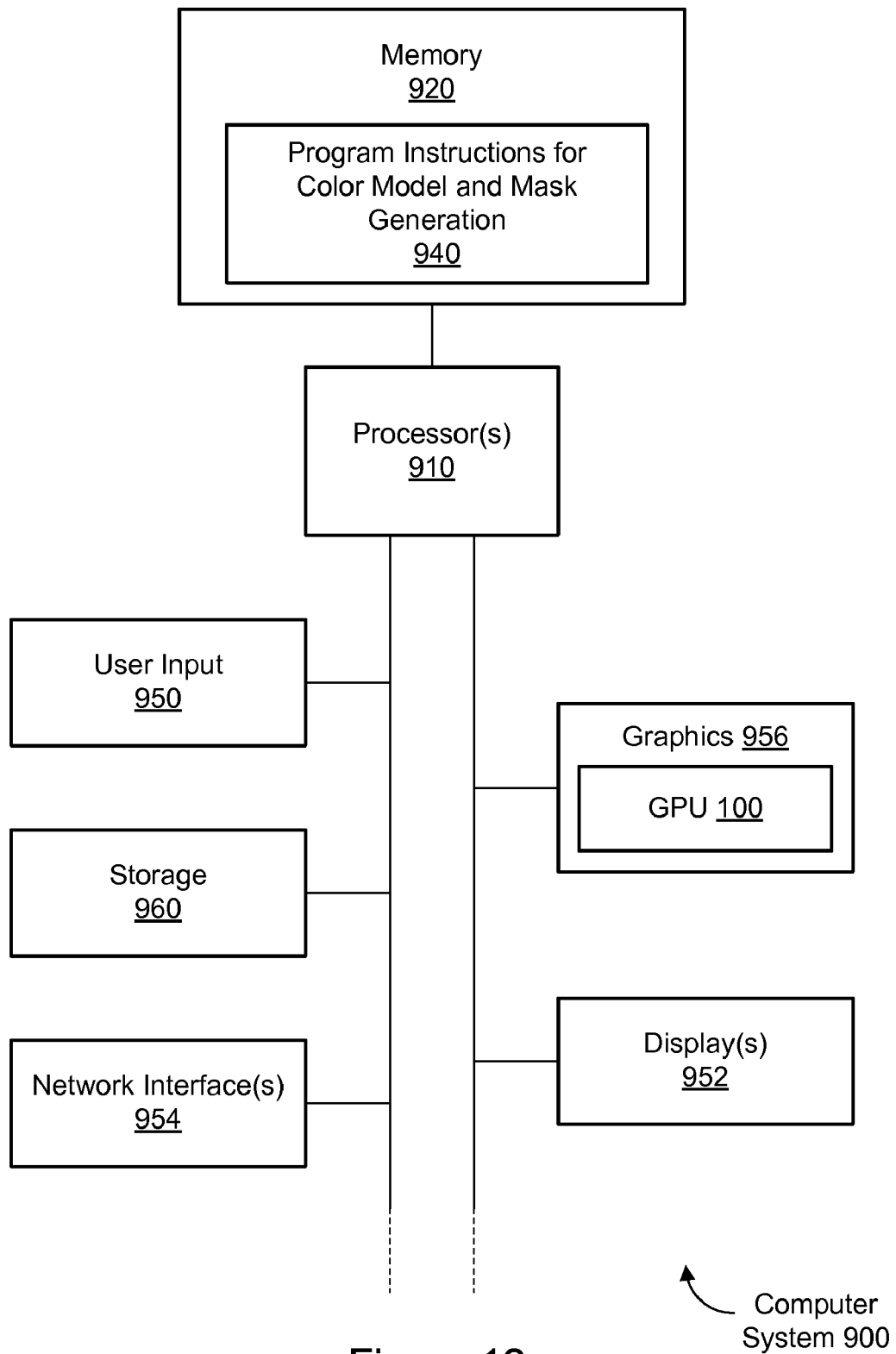
FIG. 12 is a block diagram illustrating constituent elements of a computer system that is configured to implement embodiments of the system and methods for color model generation and/or modification.

As will be discussed in greater detail below, a color model 125 associated with the image 110 may be generated using color model generation facilities 120. As will also be discussed in greater detail below, an output mask 135 associated with the image 110 may be generated using mask generation facilities 130. As will be discussed in greater detail below, the color model 125 may be modified using one or more color model modification techniques 140 to produce an updated color model. The color model generation facilities 120, mask generation facilities 130, and color model modification techniques 140 may comprise program instructions that may be executed in association with the image editor 100. In various embodiments, the program instructions for color model generation facilities 120, mask generation facilities 130, and/or color model modification techniques 140 may be coded as an intrinsic part of the image editor 100 or as a plug-in module or other extension to the image editor 100. As shown in FIG. 12, the image editing program 100 and its constituent elements and data may be stored in a memory of a computer system.

Figure 2:
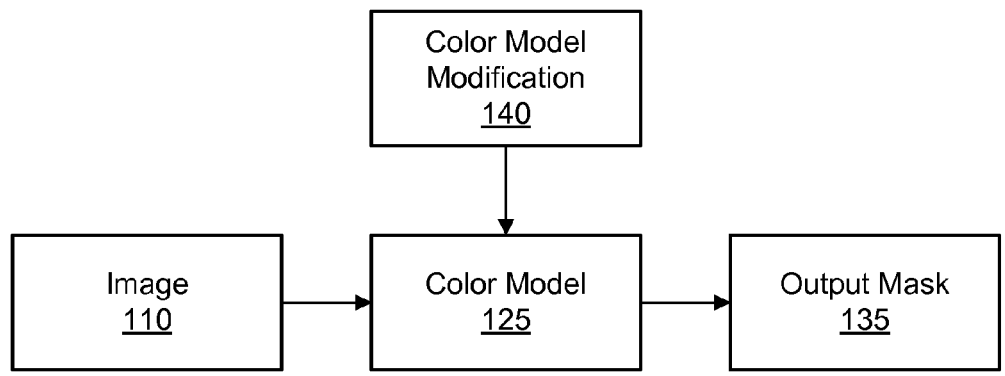
FIG. 2 illustrates a workflow associated with mask generation based on a color model according to one embodiment.

FIG. 2 illustrates a workflow associated with mask generation based on a color model according to one embodiment. The color model 125 may be generated, at least in part, based on pixels in the input image 110. The output mask 135 may be generated, at least in part, based on the color model 125. In one embodiment, the mask 135 may be generated by building a statistical color model 125 based on user-selected colors and applying the model to the pixels in the input image 110. One or more of the color model modification techniques 140 may be used to modify or update the color model 125 without the need to generate a new color model.

Figure 3:
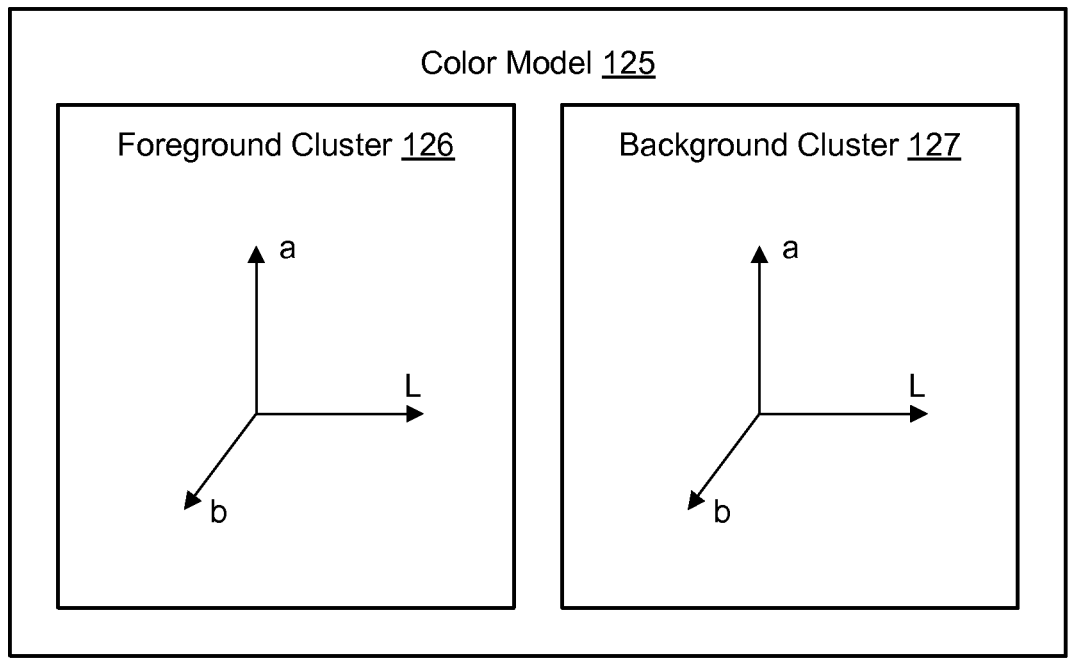
FIG. 3 illustrates a color model including a foreground cluster and a background cluster according to one embodiment.

In one embodiment, the color model 125 comprises a foreground cluster and a background cluster. The foreground cluster may model the colors added by a user. The background cluster may models the colors subtracted by the user. FIG. 3 illustrates the color model 125 including the foreground cluster 126 and the background cluster 127 according to one embodiment. Each cluster may comprise a plurality of truncated Gaussian functions. Together, the two clusters may be used to compute the output mask 135. The use of truncated Gaussian functions may permit the generation of a suitable mask 135 based on a smaller number of color samples than may be required by the use of full Gaussian functions.

In one embodiment, the truncated Gaussian functions may be defined in a color space that separates luminance from chrominance. In one embodiment, for example, the truncated Gaussian functions may be defined in a Lab 3D color space (rather than, for example, an RGB color space). A Lab color space may comprise a color-opponent space with dimension L for lightness and dimensions a and b for the color-opponent dimensions. In one embodiment, the truncated Gaussian functions may be defined in a YCbCr color space. In a YCbCr color space, Y is the luminance component and Cb and Cr are the blue-difference and red-difference chrominance components. Other color spaces may be used in other embodiments.

Figure 4:
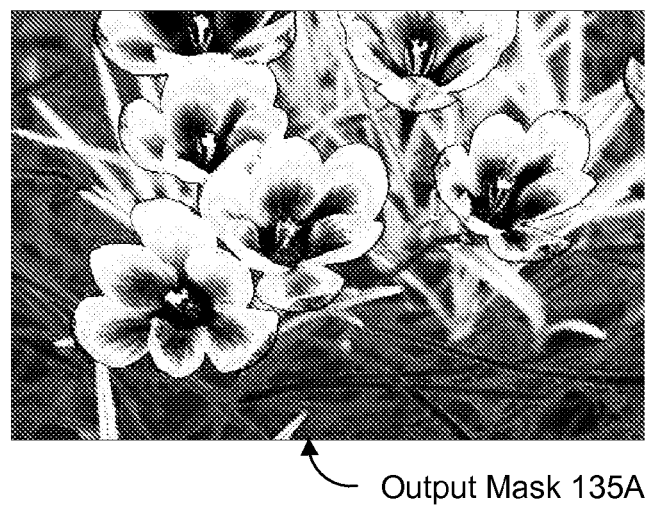
FIG. 4 illustrates an example of an output mask generated in accordance with one embodiment.

The output mask 135 may represent particular regions or objects in the image 110. The output mask 135 may include various elements (e.g., pixels) that are contiguous or not contiguous. In one embodiment, the output mask 135 may be a soft mask that includes one or more pixels having intermediate values. The range of values in the soft mask may be represented as values in an alpha channel (e.g., alpha values). For example, if full exclusion from the output mask 135 is indicated by a value of zero, and if full inclusion in the output mask 135 is indicated by a value of one, then a range of intermediate values between zero and one (e.g., 0.5) may indicate partial or "soft" inclusion in the output mask 135. Alternatively, integer values in an appropriate range (e.g., 0 and 255) may be used. This partial inclusion of some pixels may be used for transparency effects, feathering effects, blending effects, etc. FIG. 4 illustrates an example of an output mask 135A generated in accordance with one embodiment. In the output mask 135A, lighter pixels (i.e., pixels closer to white) may have a greater degree of inclusion or membership in the mask while darker pixels (i.e., pixels closer to black) may have a lesser degree of inclusion or membership in the mask. For example, the output mask 135A may be generated by the addition of colors found in the flower petals (e.g., violet), pistils and/or stamens (e.g., yellow), and stems (e.g., green) to the foreground cluster. In one embodiment, the output mask 135A may also be modified by the selection of colors to be added to the background cluster and therefore subtracted from the output mask. The colors in the foreground and/or background may be selected by a user through appropriate tools in a graphical user interface (GUI) for selecting pixels in the image 110. In one embodiment, the color model and corresponding output mask 135A may be updated dynamically and automatically (e.g., substantially in real time) with the selection of each foreground or background color by the user.

In one embodiment, the color model 125 may be incrementally updated based on user input, and the mask 135 may be automatically and dynamically adjusted as a result of the updating of the color model 125. In one embodiment, the color model modification techniques 140 may include the ability to add a color to the color model 125. For example, a user may add a color to the existing color model to indicate that pixels with similar colors should have higher alpha values in the resulting mask 135. Thus, the pixels with similar colors as the added color may be selected as foreground in the resulting mask 135. In one embodiment, the color model modification techniques 140 may include the ability to subtract a color from the color model 125. For example, a user may subtract a color from the existing color model to indicate that pixels with similar colors should have lower alpha values in the resulting mask 135. Thus, the pixels with similar colors as the added color may be excluded from the resulting mask 135. In one embodiment, the color model modification techniques 140 may include the ability to change the color tolerance or other behavior of the color model 125.

The foreground cluster 126 may be denoted as $M_F$, and the background cluster 127 may be denoted as $M_B$. Each truncated Gaussian function in the foreground cluster may be denoted as $M_F^i$, and each truncated Gaussian function in the background cluster may be denoted as $M_B^j$. Mathematically, given a pixel I=(l,a,b), its alpha value may be computed as:

$$p = \max_i(M_F^i(l, a, b)) - \max_j(M_B^j(l, a, b)) \quad (1)$$

In one embodiment, because added colors and subtracted colors are modeled separately, the color model 125 may not be subtracted to zero. In one embodiment, the numbers of Gaussian functions may be dynamically adjusted, as will be described in greater detail below. In one embodiment, the value p is truncated to make it strictly vary between 0 and 1.

In one embodiment, the three channels may be treated independently if the input colors are in Lab color space, such that:

$$\begin{cases} M_F^i(l, a, b) = G_{Fl}^i(l) \cdot G_{Fa}^i(a) \cdot G_{Fb}^i(b) \\ M_B^i(l, a, b) = G_{Bl}^i(l) \cdot G_{Ba}^i(a) \cdot G_{Bb}^i(b) \end{cases} \quad (2)$$

where $G_{Fl}^i(l)$, $G_{Fa}^i(a)$, and $G_{Fb}^i(b)$ are three one-dimensional truncated Gaussian functions.

Figure 5:
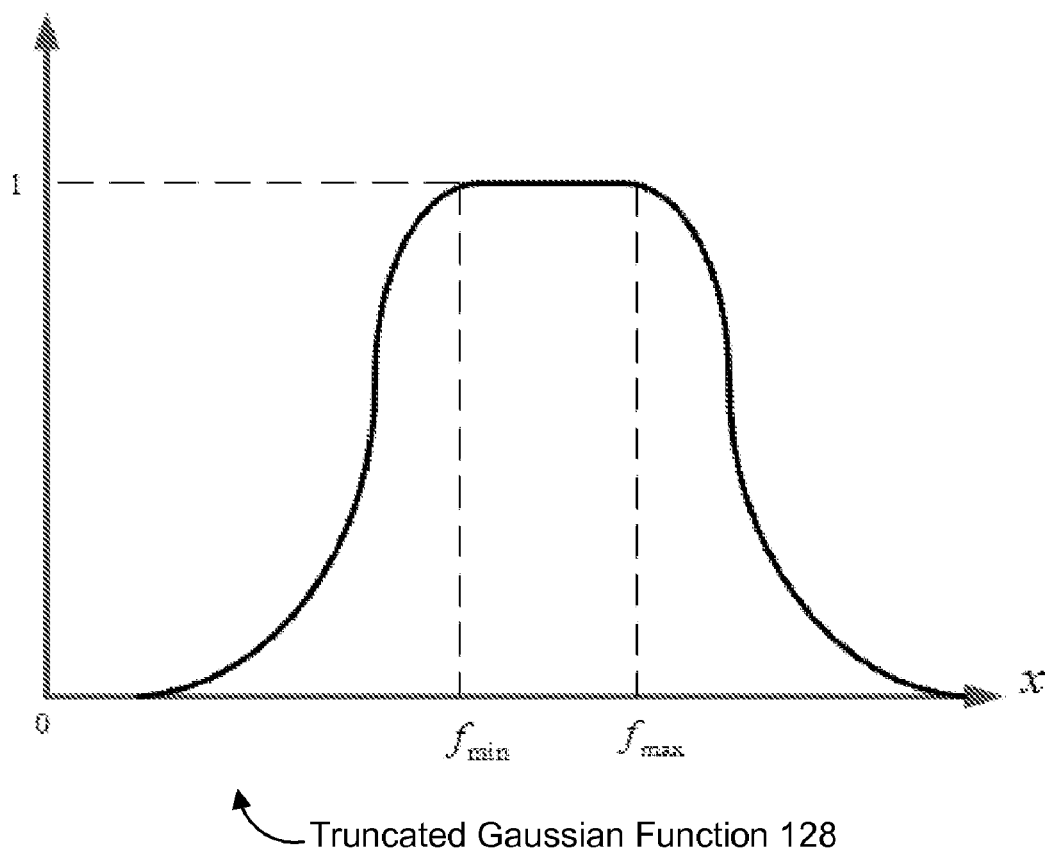
FIG. 5 illustrates an example of a one-dimensional truncated Gaussian function according to one embodiment.

FIG. 5 illustrates an example of a one-dimensional truncated Gaussian function 128 according to one embodiment. In one embodiment, the truncated Gaussian function 128 may be used because it may better encapsulate multiple input values than a complete Gaussian shape. The truncated Gaussian function 128 may be defined as:

$$G(x \mid f_{min}, f_{max}, \sigma) = \begin{cases} \exp(-(f_{min} - x)^2/\sigma^2) & x < f_{min} \\ 1, & f_{min} < x < f_{max} \\ \exp(-(f_{max} - x)^2/\sigma^2) & x > f_{max} \end{cases} \quad (3)$$

The value σ is the variance of the Gaussian and may be referred to herein as the "color tolerance" of the color model 125.

In one embodiment, the number of Gaussian functions in the color model 125 may vary. The number of Gaussian functions in both the foreground cluster 126 and the background cluster 127 may be dynamically adjusted in order to generate a better selection result. For example, the number of Gaussians may be dynamically adjusted according to additional input. The additional input may comprise user input such as additional color samples. The variance of each Gaussian function may be dynamically adjusted in order to account for overlapping foreground and background colors. In this manner, an existing model 125 may be adjusted (i.e., by modifying its parameters) based on additional input without the need to build a new model. In one embodiment, the color model 125 may be updated incrementally as the user provides new color samples.

Figure 6:
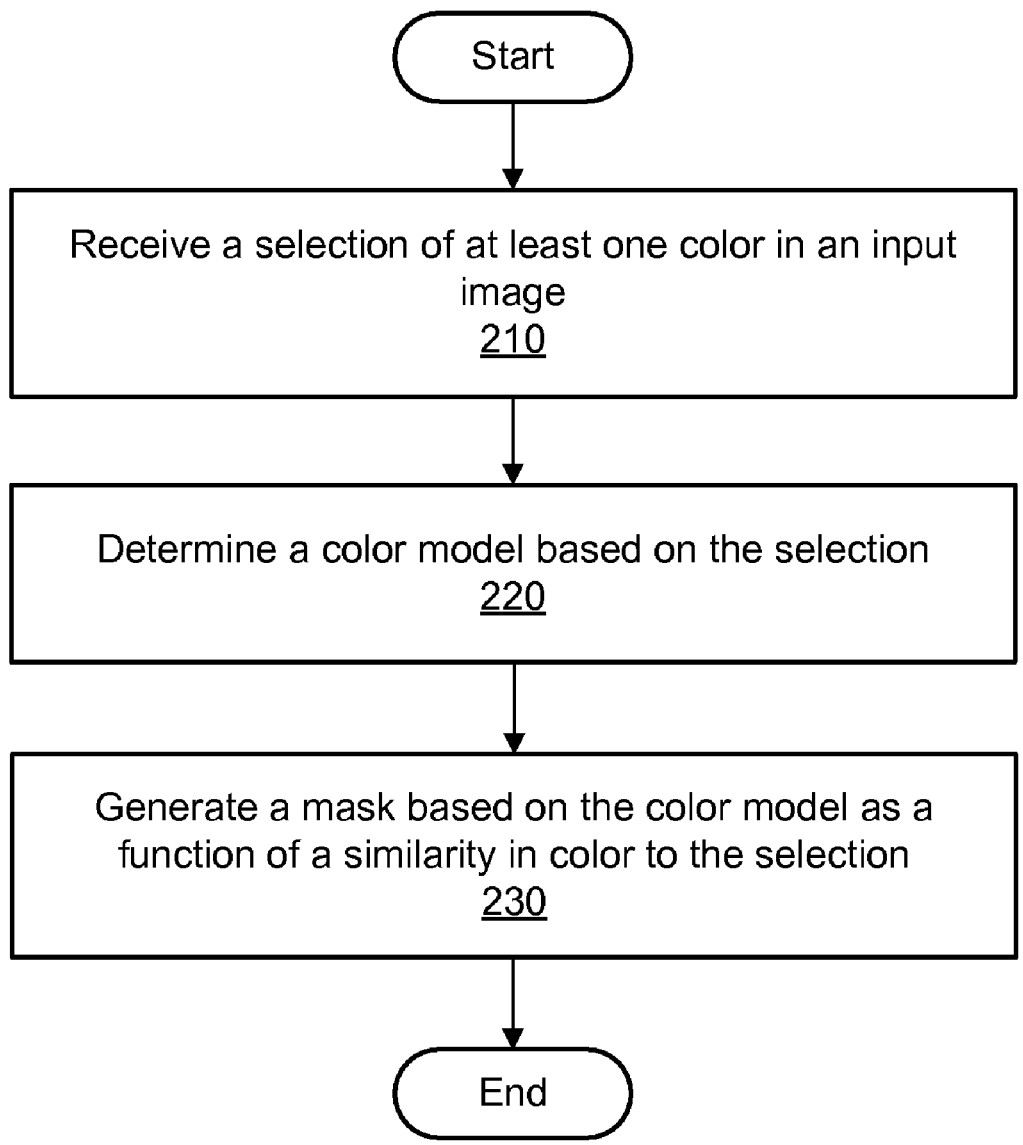
FIG. 6 is a flowchart illustrating a method for generating a mask based on a color model according to one embodiment.

FIG. 6 is a flowchart illustrating a method for generating a mask based on a color model according to one embodiment. As shown in 210, a selection of at least one color in an input image 110 may be received. The input image 110 may comprise a plurality of pixels, and the selection may comprise one or more pixels selected by a user using any suitable user-interface facilities in an image editor 100. As shown in 220, a color model 125 may be determined based on the selection of the at least one color. In one embodiment, the color model may comprise one or more truncated Gaussian functions. As shown in 230, a mask 135 may be generated based on the color model. The mask may comprise a respective value indicating a degree of membership in the mask for each of the plurality of pixels in the input image. The mask may be a soft mask, and the value indicating a degree of membership may be an intermediate value between a maximum and a minimum value in the mask. In one embodiment, the degree of membership in the mask is a function of a similarity in color to the selection. Thus, the color model may be used to generate a mask including a range of colors in the input image. The mask may be used to apply one of the image-editing operations 105 to desired portions of the image.

In one embodiment, initialization of the color model 125 may include setting the number of foreground and background Gaussian functions to be zero. The user may add a new color to the color model 125 by using any suitable facility in the image editor 100 to select the desired color. For example, the user may use an "eyedropper" tool to select the color of a particular pixel in the existing image 110, or the user may use another facility such as a color wheel. In one embodiment, the addition of a new color to the model may result in an automatic determination as to whether the color will be used to create a new foreground Gaussian, update a foreground Gaussian, or delete a background Gaussian.

Figure 7:
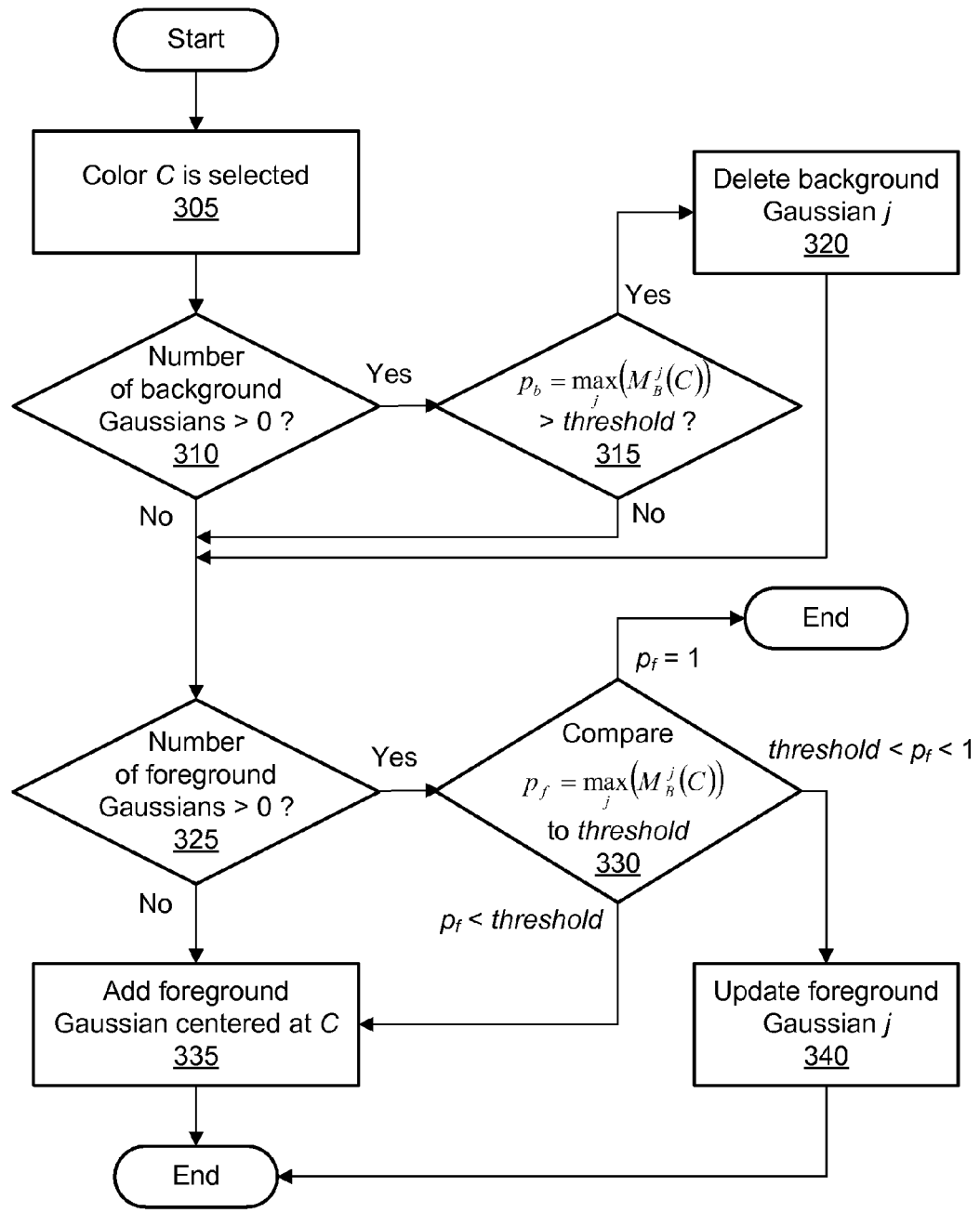
FIG. 7 is a flowchart illustrating a method for adding a color to a color model according to one embodiment.

FIG. 7 is a flowchart illustrating a method for adding a color to a color model according to one embodiment. As shown in 305, a color C is selected (e.g., by the user). The input color C is first compared to the existing background Gaussians, if any, to use any existing background Gaussians to compute a probability for the input color using Equation (2). If the probability is large, then the color has already been modeled as a background color, and the corresponding background Gaussian may be deleted in order to re-model it as a foreground Gaussian. Thus, as shown in 310, it is determined whether the number of background Gaussian functions (e.g., the number of truncated Gaussian functions in the background cluster) is greater than zero. If so, then as shown in 315, it is determined whether a probability value $$p_b = \max_j (M_B^j(C))$$

is greater than a threshold value. If $p_b$ exceeds the threshold, then the background Gaussian function j is deleted, as shown in 320.

The input color C is then compared to existing foreground Gaussians, if any. As shown in 325, it is determined whether the number of foreground Gaussian functions (e.g., the number of truncated Gaussian functions in the foreground cluster) is greater than zero. If not, then a new foreground Gaussian function (e.g., mathematically centered at C) is added, as shown in 335. However, if the number of foreground Gaussians is greater then zero, then as shown in 330, a probability value $$p_f = \max_j (M_B^j(C))$$

is compared to a threshold value. In one embodiment, the threshold value used in 330 is 0.75. In one embodiment, the threshold value used in 330 is the same as the threshold value used in 315; in another embodiment, the thresholds differ. If $p_f$ is less than the threshold, then as shown in 335, a new foreground Gaussian function centered at C is added because the input color C is sufficiently different from the existing foreground Gaussians. If $p_f$ is greater than the threshold but less than 1, then as shown in 340, the foreground Gaussian function j is updated using the input color C because the Gaussian function j is similar in color to C. If $p_f$ equals 1, then the color C has already been modeled as a foreground Gaussian, and no further action is taken.

In one embodiment, pseudocode for an AddColor( ) function that implements the method illustrated in FIG. 7 is as follows:

```
AddColor(color)
    if (number of Background Gaussians M_B^j >0)

p_background = max (M_B^j(color));
                       j

If( p_background > threshold ) DeleteBackgroundGaussian(j);
    Endif
    if (number of Background Gaussians M_F^j >0)

p_foreground = max (M_F^j(color))
                       j if( p_foreground ==1.0) return;
        else if( p_foreground <1.0 && p_foreground > threshold )
            UpdateForegroundGaussian(j, color);
            Return;
        endif
    endif
```

```
    End AddNewForegroundGaussian(color);
End
```

The UpdateForegroundGaussian( ) function may re-adjust or expand $f_{min}$ and $f_{max}$ value to cover the input color. The AddNewForegroundGaussian( ) function may create a real Gaussian by setting $f_{min}=f_{max}=$color.

Figure 8:
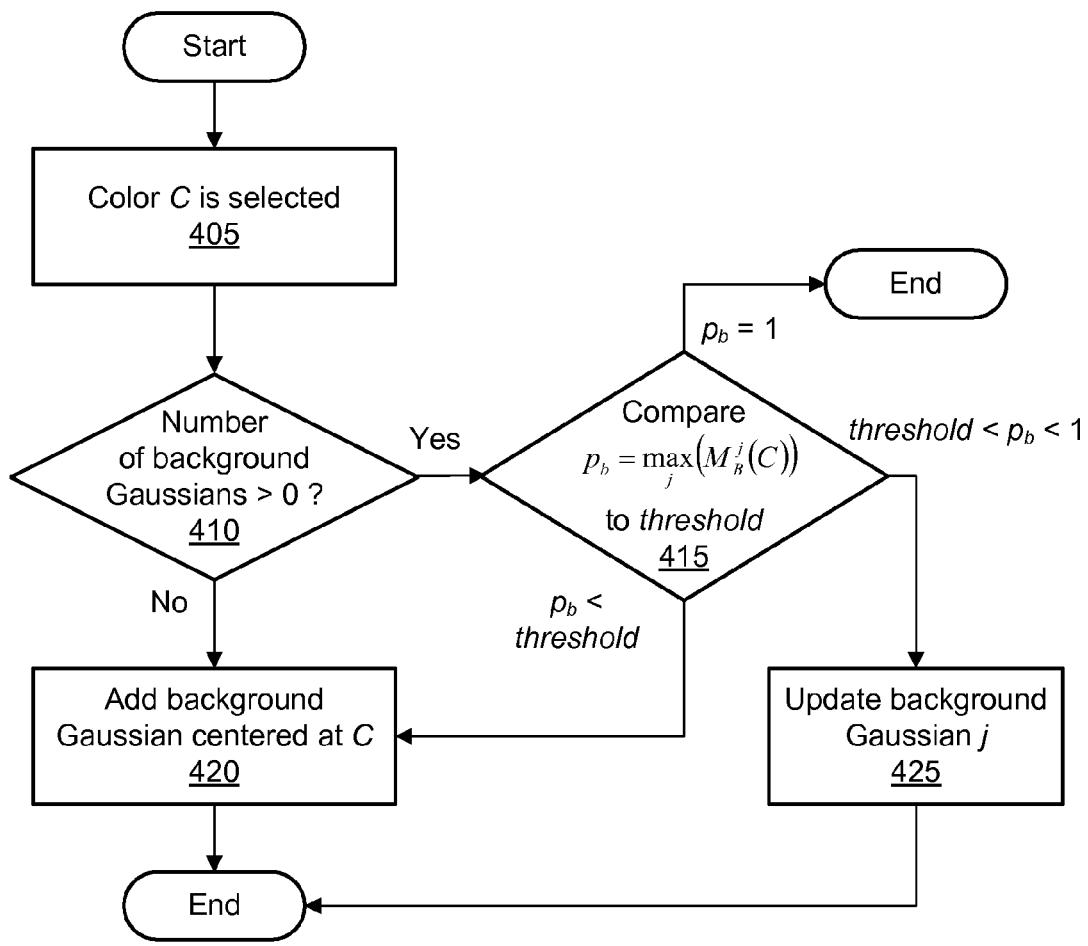
FIG. 8 is a flowchart illustrating a method for subtracting a color from a color model according to one embodiment.

FIG. 8 is a flowchart illustrating a method for subtracting a color from a color model according to one embodiment. Subtracting a color may result in adding the color to the background Gaussian functions. As shown in 405, a color C is selected (e.g., by the user). The input color C may be compared to the existing background Gaussians, if any. If the input color is sufficiently close to an existing background Gaussian, then the input color may be used to update that existing Gaussian. If the color is sufficiently far away from all existing background Gaussians, then a new background Gaussian may be added to the color model based on the input color C. Thus, as shown in 410, it is determined whether the number of background Gaussian functions (e.g., the number of truncated Gaussian functions in the background cluster) is greater than zero. If not, then a new background Gaussian function centered at C is added, as shown in 420. However, if the number of background Gaussians is greater then zero, then as shown in 415, a probability value $$p_b = \max_j (M_B^j(C))$$

is compared to a threshold value. If $p_b$ is less than the threshold, then as shown in 420, a new background Gaussian function centered at C is added because the input color C is sufficiently different from the existing background Gaussians. If $p_b$ is greater than the threshold but less than 1, then as shown in 425, the background Gaussian function j is updated using the input color C because the Gaussian function j is similar in color to C. If $p_b$ equals 1, then the color C has already been modeled as a background Gaussian, and no further action is taken.

In one embodiment, pseudocode for a SubtractColor function that implements the method illustrated in FIG. 8 is as follows:

```
SubtractColor(color)
    if (number of background Gaussians M_F^j >0)

p_background = max (M_B^j(color))
                       j if( p_background ==1.0) return;
        else if( p_background <1.0 && p_background > threshold)
            UpdateBackgroundGaussian(j, color);
            Return;
        endif
    endif
    AddNewBackgroundGaussian(color, σ);
End
```

In one embodiment, the color tolerance parameter $\sigma_0$ may be modified (e.g., by a user). If the input color type is expressed in a Lab color space, then the color model may be set initially such that $\sigma_L = \sigma_0$ and $\sigma_A = \sigma_B = \sigma_0/3$. When the user sets a new tolerance $\sigma_1$, the ratio $\sigma_1/\sigma_0$ may be used to adjust the tolerance of each existing Gaussian. In this manner, the tolerance of the L component may be specified differently from the tolerance of the a and b components. In one embodiment, a separate tolerance value may be maintained for each Gaussian function.

In one embodiment, the color model may be extended to include spatial dimensions in addition to the existing color-related dimensions. For example, the color model may be extended from three dimensions (3D) to five dimensions (5D). The additional dimensions may give the user a higher degree of freedom to control the behavior of the model. In a 3D color model, an input color may be expressed in a format such as (R,G,B) or (L,a,b). In the 5D color model, an input color may be expressed in a format such as (R,G,B,x,y) or (L,a,b,x,y). The additional values x and y may represent normalized spatial locations of the selected pixel such that $0 \leq x \leq 1$ and $0 \leq y \leq 1$. Thus, when the user selects a pixel (e.g., to add to the color model), the location of the pixel in addition to its color may be used to build or modify the color model. The 5D color model may therefore comprise a location-weighted color model. The resulting mask may similarly reflect the location of the input color, as will be discussed below.

In one embodiment, both location dimensions and color dimensions in the 5D color model may be represented by truncated Gaussian functions. Similar to Equation (1) for the 3D color model, the foreground probability of a pixel (L, a, b, x, y) in the 5D color model may be computed as:

$$p = \max_i(M_F^i(l, a, b, x, y)) - \max_j(M_B^j(l, a, b, x, y)) \qquad (4)$$

The use of a Lab color space may permit a 5D Gaussian function to be expanded as a dot product of five one-dimensional (1D) Gaussian functions. The probability computed from each Gaussian cluster may be computed as:

$$\begin{cases} M_F^i(l, a, b, x, y) = G_{Fl}^i(l) \cdot G_{Fa}^i(a) \cdot G_{Fb}^i(b) \cdot G_{Fx}^i(x) \cdot G_{Fy}^i(y) \\ M_B^i(l, a, b, x, y) = G_{Bl}^i(l) \cdot G_{Ba}^i(a) \cdot G_{Bb}^i(b) \cdot G_{Bx}^i(x) \cdot G_{By}^i(y) \end{cases} \qquad (5)$$

In one embodiment, the color and/or spatial covariance of each Gaussian may also be dynamically adjusted based on additional input. The parameter $\sigma_s$ is the tolerance parameter for the two extra spatial Gaussian functions. The spatial tolerance parameter $\sigma_s$ may be user-modifiable using any suitable user interface option, such as a slider bar. Modification of the spatial tolerance parameter may alter the degree of the location-weighting in the color model and the resulting mask.

By using spatial Gaussian functions, the application of the color model may be restricted to a particular region of the image instead of the entire image. FIG. 9 illustrates an example of an output mask 135B generated using a three-dimensional color model according to one embodiment. FIG. 10 illustrates an example of an output mask 135C generated using a five-dimensional color model according to one embodiment. Although the output mask 135C is based on the same input image as the output mask 135C, the use of the additional spatial parameters results in a mask 135C that is weighted by location. In this manner, the use of a location-weighted color model may permit the user to select one object in a particular region of the image to the exclusion of similarly colored objects located in other regions throughout the image.

Figure 11:
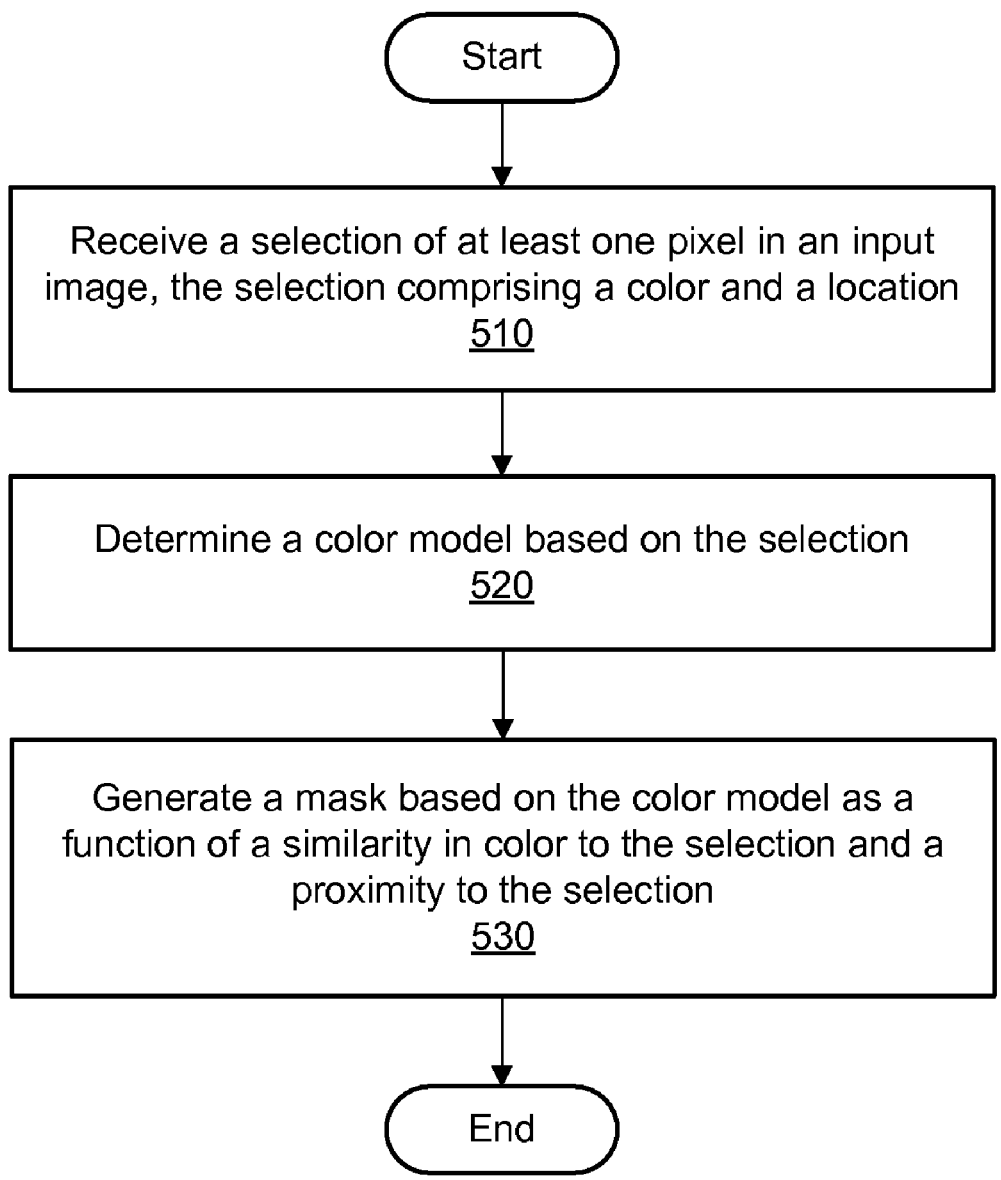
FIG. 11 is a flowchart illustrating a method for generating a mask based on a color model including spatial dimensions according to one embodiment.

FIG. 11 is a flowchart illustrating a method for generating a mask based on a color model including spatial dimensions according to one embodiment. As shown in 510, a selection of at least one pixel in an input image 110 may be received. The input image 110 may comprise a plurality of pixels, and the selection may comprise one or more pixels selected by a user using any suitable user-interface facilities in an image editor 100. The selection may comprise at least one color of the at least one pixel and at least one location within the input image of the at least one pixel. As shown in 520, a color model 125 may be determined based on the selection of the at least one pixel. In one embodiment, the color model may comprise one or more truncated Gaussian functions. As shown in 530, a mask 135 may be generated based on the color model. The mask may comprise a respective value indicating a degree of membership in the mask for each of the plurality of pixels in the input image. The mask may be a soft mask, and the value indicating a degree of membership may be an intermediate value between a maximum and a minimum value in the mask. In one embodiment, the degree of membership in the mask is a function of a similarity in color to the selection and a proximity to the location of the selection. Thus, the color model may be used to generate a location-weighted mask including a range of colors in the input image. The mask may be used to apply one of the image-editing operations 105 to desired portions of the image.

FIG. 12 is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 100. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 12, as illustrated by the ellipsis.

In various embodiments, the elements shown in FIGS. 6, 7, 8, and 11 may be performed in a different order than the illustrated order. In FIGS. 6, 7, 8, and 11, any of the operations described in the elements may be performed programmatically (i.e., by a computer according to a computer program). In FIGS. 6, 7, 8, and 11, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   receiving a selection of at least one color in an input image comprising a plurality of pixels;
   determining a color model based on the selection of the at least one color, wherein the color model comprises one or more truncated Gaussian functions; and
   generating a soft mask based on the color model, wherein the soft mask comprises a respective value indicating a degree of membership in the soft mask for each of the plurality of pixels in the input image, wherein the degree of membership in the soft mask is a function of a similarity in color to the selection, and wherein the respective value for at least one of the plurality of pixels is an intermediate value between a minimum value and a maximum value.

2. The method as recited in claim 1, further comprising:
   receiving an additional selection of at least one additional color in the input image;
   adding the additional selection to the color model; and
   modifying the soft mask in response to adding the additional selection to the color model, wherein modifying the soft mask comprises increasing the degree of membership in the soft mask for each of the plurality of pixels having a color similar to the at least one additional color.

3. The method as recited in claim 1, further comprising:
   receiving an additional selection of at least one additional color in the input image;
   subtracting the additional selection from the color model; and
   modifying the soft mask in response to subtracting the additional selection from the color model, wherein modifying the soft mask comprises decreasing the degree of membership in the soft mask for each of the plurality of pixels having a color similar to the at least one additional color.

4. The method as recited in claim 1, further comprising:
   receiving user input comprising a new color tolerance;
   adjusting a color tolerance of at least one of the truncated Gaussian functions based on the new color tolerance; and
   modifying the soft mask in response to adjusting the color tolerance.

5. The method as recited in claim 1, further comprising:
   receiving user input to modify the color model; and
   adding one or more additional truncated Gaussian functions to the color model in response to the user input.

6. The method as recited in claim 1, further comprising:
   receiving user input to modify the color model; and
   subtracting at least one of the truncated Gaussian functions from the color model in response to the user input.

7. The method as recited in claim 1, further comprising:
   receiving user input to modify the color model; and
   modifying at least one of the truncated Gaussian functions in response to the user input.

8. The method as recited in claim 1, wherein determining the color model comprises determining a foreground cluster and a background cluster, wherein the foreground cluster comprises colors to be added to the soft mask, and wherein the background cluster comprises colors to be subtracted from the soft mask.

9. The method as recited in claim 8, wherein each of the foreground cluster and the background cluster comprises at least one of the truncated Gaussian functions.

10. The method as recited in claim 1, wherein each of the truncated Gaussian functions is defined in a color space that separates luminance from chrominance.

11. The method as recited in claim 1, further comprising:
    applying an image-editing operation to the input image using the soft mask; and
    rendering the input image to a display device after applying the image-editing operation.

12. A computer-implemented method, comprising:
    receiving a selection of at least one color in an input image comprising a plurality of pixels;
    determining a color model based on the selection of the at least one color, wherein the color model comprises one or more Gaussian functions;
    generating a first soft mask based on the color model, wherein the first soft mask comprises a respective value indicating a degree of membership in the first soft mask for each of the plurality of pixels in the input image, wherein the degree of membership in the first soft mask is a function of a similarity in color to the selection, and wherein the respective value for at least one of the plurality of pixels is an intermediate value between a minimum value and a maximum value;
    receiving user input to modify the color model;
    modifying a number of the Gaussian functions in the color model in response to receiving the user input to modify the color model, wherein modifying the number of the Gaussian functions in the color model comprises adding one or more additional Gaussian functions to the color model or subtracting at least one of the Gaussian functions from the color model; and
    generating a second soft mask based on the modified color model, wherein the second soft mask comprises a respective value indicating a degree of membership in the second soft mask for each of the plurality of pixels in the input image, wherein the degree of membership in the second soft mask is a function of a similarity in color to the selection.

13. A computer-readable storage medium, storing program instructions, wherein the program instructions are computer-executable to implement:
- receiving a selection of at least one color in an input image comprising a plurality of pixels;
- determining a color model based on the selection of the at least one color, wherein the color model comprises one or more truncated Gaussian functions; and
- generating a soft mask based on the color model, wherein the soft mask comprises a respective value indicating a degree of membership in the soft mask for each of the plurality of pixels in the input image, wherein the degree of membership in the soft mask is a function of a similarity in color to the selection, and wherein the respective value for at least one of the plurality of pixels is an intermediate value between a minimum value and a maximum value.

14. The computer-readable storage medium as recited in claim 13, wherein the program instructions are further computer-executable to implement:
- receiving an additional selection of at least one additional color in the input image;
- adding the additional selection to the color model; and
- modifying the soft mask in response to adding the additional selection to the color model, wherein modifying the soft mask comprises increasing the degree of membership in the soft mask for each of the plurality of pixels having a color similar to the at least one additional color.

15. The computer-readable storage medium as recited in claim 13, wherein the program instructions are further computer-executable to implement:
- receiving an additional selection of at least one additional color in the input image;
- subtracting the additional selection from the color model; and
- modifying the soft mask in response to subtracting the additional selection from the color model, wherein modifying the soft mask comprises decreasing the degree of membership in the soft mask for each of the plurality of pixels having a color similar to the at least one additional color.

16. The computer-readable storage medium as recited in claim 13, wherein the program instructions are further computer-executable to implement:
- receiving user input comprising a new color tolerance;
- adjusting a color tolerance of at least one of the truncated Gaussian functions based on the new color tolerance; and
- modifying the soft mask in response to adjusting the color tolerance.

17. The computer-readable storage medium as recited in claim 13, wherein the program instructions are further computer-executable to implement:
- receiving user input to modify the color model; and
- adding one or more additional truncated Gaussian functions to the color model in response to the user input.

18. The computer-readable storage medium as recited in claim 13, wherein the program instructions are further computer-executable to implement:
- receiving user input to modify the color model; and
- subtracting at least one of the truncated Gaussian functions from the color model in response to the user input.

19. The computer-readable storage medium as recited in claim 13, wherein the program instructions are further computer-executable to implement:
- receiving user input to modify the color model; and
- modifying at least one of the truncated Gaussian functions in response to the user input.

20. The computer-readable storage medium as recited in claim 13, wherein determining the color model comprises determining a foreground cluster and a background cluster, wherein the foreground cluster comprises colors to be added to the soft mask, and wherein the background cluster comprises colors to be subtracted from the soft mask.

21. The computer-readable storage medium as recited in claim 13, wherein each of the truncated Gaussian functions is defined in a color space that separates luminance from chrominance.

22. A computer-readable storage medium, storing program instructions, wherein the program instructions are computer-executable to implement:
- receiving a selection of at least one color in an input image comprising a plurality of pixels;
- determining a color model based on the selection of the at least one color, wherein the color model comprises one or more Gaussian functions;
- generating a first soft mask based on the color model, wherein the first soft mask comprises a respective value indicating a degree of membership in the first soft mask for each of the plurality of pixels in the input image, wherein the degree of membership in the first soft mask is a function of a similarity in color to the selection, and wherein the respective value for at least one of the plurality of pixels is an intermediate value between a minimum value and a maximum value;
- receiving user input to modify the color model;
- modifying a number of the Gaussian functions in the color model in response to receiving the user input to modify the color model, wherein modifying the number of the Gaussian functions in the color model comprises adding one or more additional Gaussian functions to the color model or subtracting at least one of the Gaussian functions from the color model; and
- generating a second soft mask based on the modified color model, wherein the second soft mask comprises a respective value indicating a degree of membership in the second soft mask for each of the plurality of pixels in the input image, wherein the degree of membership in the second soft mask is a function of a similarity in color to the selection.

23. A system, comprising:
- at least one processor; and
- a memory coupled to the at least one processor, wherein the memory stores program instructions, wherein the program instructions are executable by the at least one processor to:
  - receive a selection of at least one color in an input image comprising a plurality of pixels;
  - determine a color model based on the selection of the at least one color, wherein the color model comprises one or more truncated Gaussian functions; and
  - generate a soft mask based on the color model, wherein the soft mask comprises a respective value indicating a degree of membership in the soft mask for each of the plurality of pixels in the input image, wherein the degree of membership in the soft mask is a function of a similarity in color to the selection, and wherein the respective value for at least one of the plurality of pixels is an intermediate value between a minimum value and a maximum value.

24. The system as recited in claim 23, wherein the program instructions are further executable by the at least one processor to:
- receive an additional selection of at least one additional color in the input image;
- add the additional selection to the color model; and
- modify the soft mask in response to adding the additional selection to the color model, wherein modifying the soft mask comprises increasing the degree of membership in the soft mask for each of the plurality of pixels having a color similar to the at least one additional color.

25. The system as recited in claim 23, wherein the program instructions are further executable by the at least one processor to:
- receive an additional selection of at least one additional color in the input image;
- subtract the additional selection from the color model; and
- modify the soft mask in response to subtracting the additional selection from the color model, wherein modifying the soft mask comprises decreasing the degree of membership in the soft mask for each of the plurality of pixels having a color similar to the at least one additional color.

26. The system as recited in claim 23, wherein the program instructions are further executable by the at least one processor to:
- receive user input comprising a new color tolerance;
- adjust a color tolerance of at least one of the truncated Gaussian functions based on the new color tolerance; and
- modify the soft mask in response to adjusting the color tolerance.

27. The system as recited in claim 23, wherein the program instructions are further executable by the at least one processor to:
- receive user input to modify the color model; and
- add one or more additional truncated Gaussian functions to the color model in response to the user input.

28. The system as recited in claim 23, wherein the program instructions are further executable by the at least one processor to:
- receive user input to modify the color model; and
- subtract at least one of the truncated Gaussian functions from the color model in response to the user input.

29. The system as recited in claim 23, wherein the program instructions are further executable by the at least one processor to:
- receive user input to modify the color model; and
- modify at least one of the truncated Gaussian functions in response to the user input.

30. The system as recited in claim 23, wherein the color model comprises a foreground cluster and a background cluster, wherein the foreground cluster comprises colors to be added to the soft mask, and wherein the background cluster comprises colors to be subtracted from the soft mask.

31. The system as recited in claim 23, wherein each of the truncated Gaussian functions is defined in a color space that separates luminance from chrominance.

32. A system, comprising:
at least one processor; and
a memory coupled to the at least one processor, wherein the memory stores program instructions, wherein the program instructions are executable by the at least one processor to:
- receive a selection of at least one color in an input image comprising a plurality of pixels;
- determine a color model based on the selection of the at least one color, wherein the color model comprises one or more Gaussian functions;
- generate a first soft mask based on the color model, wherein the first soft mask comprises a respective value indicating a degree of membership in the first soft mask for each of the plurality of pixels in the input image, wherein the degree of membership in the first soft mask is a function of a similarity in color to the selection, and wherein the respective value for at least one of the plurality of pixels is an intermediate value between a minimum value and a maximum value;
- receive user input to modify the color model;
- modify a number of the Gaussian functions in the color model in response to receiving the user input to modify the color model, wherein modifying the number of the Gaussian functions in the color model comprises adding one or more additional Gaussian functions to the color model or subtracting at least one of the Gaussian functions from the color model; and
- generate a second soft mask based on the modified color model, wherein the second soft mask comprises a respective value indicating a degree of membership in the second soft mask for each of the plurality of pixels in the input image, wherein the degree of membership in the second soft mask is a function of a similarity in color to the selection.

\* \* \* \* \*